(No Model.)
S. D. FELT.
SHEPHERD'S CROOK.
No. 291,177. Patented Jan. 1, 1884.
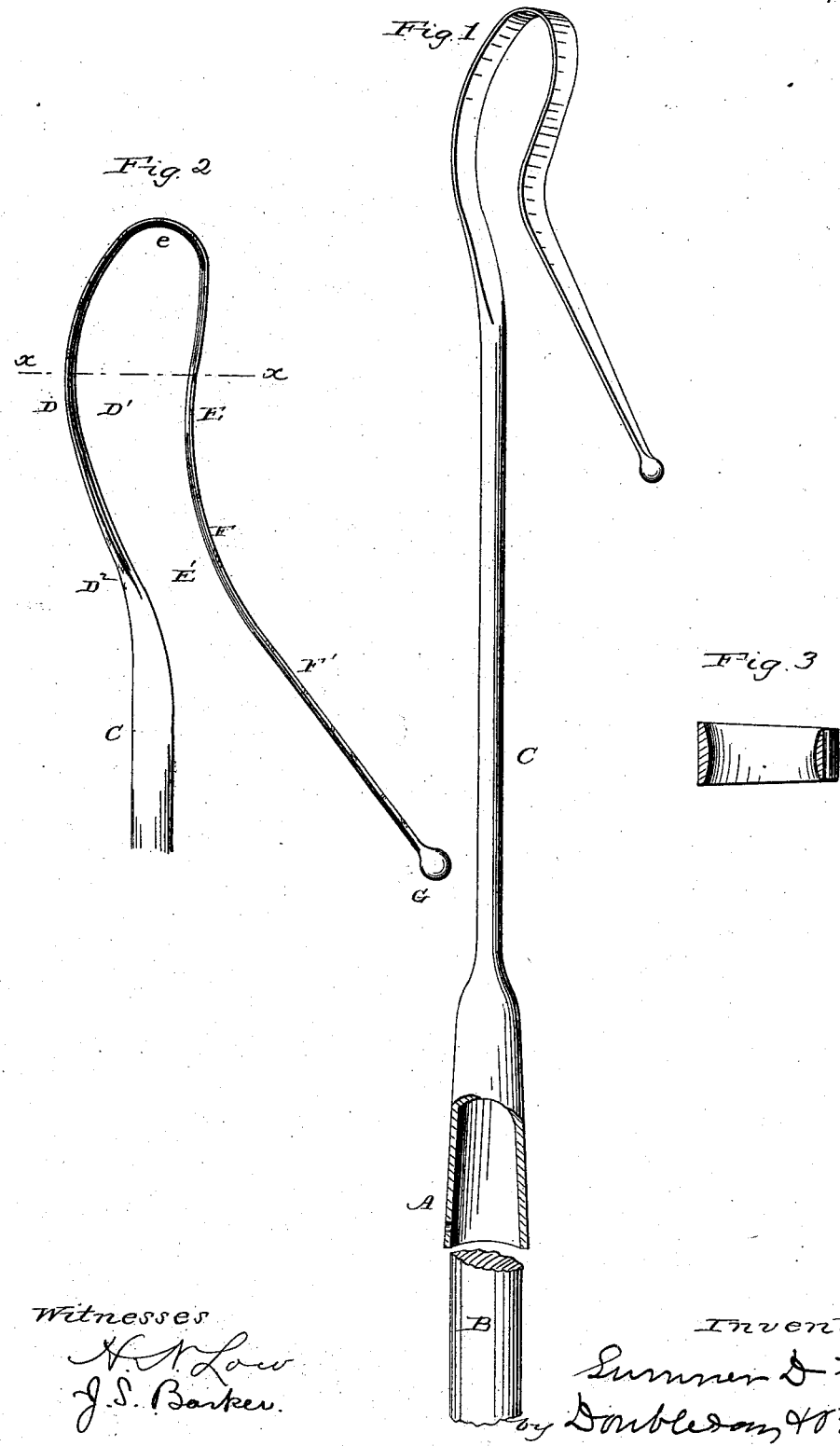
Witnesses
H. N. Low
J. S. Barker.
Inventor
Sumner D. Felt
by Doubleday & Bliss
attys.

UNITED STATES PATENT OFFICE.

SUMNER D. FELT, OF JACKSON, MICHIGAN.

SHEPHERD'S CROOK.

SPECIFICATION forming part of Letters Patent No. 291,177, dated January 1, 1884.

Application filed April 13, 1883. (No model.)

*To all whom it may concern:*

Be it known that I, SUMNER D. FELT, a citizen of the United States, residing at Jackson, in the county of Jackson and State of Michigan, have invented certain new and useful Improvements in Shepherds' Crooks, of which the following is a specification, reference being had therein to the accompanying drawings.

The object of this invention is to provide those tending sheep with an implement for catching and managing them, which shall be simple in structure, strong, durable, and cheap, and which shall be capable of ready manipulation, so that it can be quickly applied in the manner that may be required.

Figure 1 shows in perspective one of my improved crooks. Fig. 2 is a side elevation. Fig. 3 is a cross-section on the line $xx$, Fig. 2.

In the drawings, A represents a socket-piece, by means of which the implement is fastened to a wooden handle, as shown in Fig. 1. Just above or beyond the socket portion is the main shank or stem C, which is preferably made considerably smaller than the socket, and is extended to a suitable length, the length being generally about five and a half inches.

The letter D indicates the part next to the shank, and which is curved away from the line thereof—that is to say, is bent off to one side—and which, with the part E, forms the loop or eye, by means of which the implement can be used for grasping and holding the leg or other part of the animal. The last said part E is bent back toward the line of the shank or handle, the bend at $e$ being comparatively somewhat sharp, so as to produce the loop or eye D', above mentioned, which, as will be seen, is somewhat oval or elliptical, and has its longer axis inclined to the longitudinal line of the shank or stem. A loop or eye of this shape I have found to be of a very superior character, in that it prevents the animal from kicking out, as the leg, if moved backward, strikes against the part D' or the part E, the mouth or throat E' of the loop being so situated that the leg does not, under ordinary circumstances, come into proper position (relatively to the opening) to pass through readily. This mouth or throat of the loop, it will be seen, is also situated at an angle to the stem or shank C. Therefore, by a slight movement sidewise, the herder is able to cause the crook to catch the animal's leg; but after being once caught the herder's action is to pull on the line of the shank C, which, as above described, holds the implement in such way that the animal's leg cannot escape.

To produce the mouth or throat E', the bar of metal of which the implement is made is just beyond the part E bent outward again away from the line of the shank, it being preferably for a short distance about parallel with the part D and the joining part $D^2$, between the parts D and C. This curved part F is extended, as shown at F', outwardly far enough to adapt it to serve to catch the leg of the animal and to guide it through the throat E' into the loop D'. At the end there is formed a ball or knob, G, which prevents the cutting of or accident to the animal when the implement is brought into contact with it.

I am aware of the fact that wooden crooks of various styles have been heretofore used for this purpose, and do not wish to be understood as claiming those devices; but it is well known that the wooden crooks are of a very inferior character, as they are not only clumsy and difficult to handle, but, moreover, are not durable, especially when made of two or more parts at the outer end.

I am also aware of the fact that the attempt has been made to use metallic crooks; but I believe myself to be the first to have succeeded in providing an implement having the characteristics incident to the one herein shown, and which, from a wide experience, I have found to be very successful, especially in the case with which the leg of the animal can be guided into the loop, and the difficulty experienced by the animal in getting the leg out therefrom, and the length of time during which the steel part retains its elasticity, this latter being a matter of great superiority in my implement over those that have heretofore been used. These metallic ones above alluded to as in previous use have been made of round iron, and not only have they been inferior from the shape of the iron in cross-section, but also from the fact of being made of iron. Moreover, my improved crook is much lighter than any of the character that has been heretofore experimented with, it being small and weighing but a few ounces, so that it can be applied to a long handle and held and manipulated at a distance from the herder's hand.

The material from which the implement is formed is finely-tempered elastic steel, the metal being specially manufactured for this purpose and so treated as to give it elasticity and at the same time to make the texture thereof firm that the several parts shall retain their shape for a long time.

By examining Fig. 3 it will be seen that the inner surface of the metal is somewhat thinner at the edges, it being rounded off so as to prevent any injury to the leg of the sheep, the requisite strength being secured by having it thicker at the central part. To permit it, however, to be sufficiently elastic upon the outside, it is preferably flat or rectilinear in cross-section, as shown in said figure.

I do not wish to be limited in all respects, however, to this matter, but prefer, on account of the increase in elasticity, to make the implements in this way. It will be further seen that the bar of metal of which the crook is formed is flat, considered as a whole—that is to say, its width (measured on a line transverse to the plane of the loop) is considerably greater than its thickness. This provides sufficient strength of metal and at the same time makes the bar far more elastic than it is possible to have those made of the round iron heretofore used, said round iron being, in fact, practically without any elasticity whatever.

In the manufacture of my crook I cut steel rods of the proper size into suitable lengths for the crook portion proper and weld them to the sockets A. The rods are then drawn, by means of suitable dies and hammers, to give the proper size and transverse shape—that is, having one flat and one rounded face—and to form the knob G upon the end. The article, which at this stage in the manufacture is straight, is ground to perfect the rounded face, after which the proper bends are given by bending in a former. The article, being then of proper shape, is ground and polished, when it is ready for use and sale.

What I claim is—

1. The herein-described implement for catching and holding sheep, it having a shank, C, and a loop formed of a bent bar, which has the diameter or width transverse to the plane or loop greater than the thickness of the bar, whereby the crook may be made highly elastic.

2. The herein-described implement for catching and holding sheep, it having a loop for holding the leg of the animal made of elastic material rounded upon the inner side, whereby it prevents the harming of the animal, and flattened upon the outer side or face, whereby the elasticity is increased, substantially as set forth.

In testimony whereof I affix my signature in presence of two witnesses.

S. D. FELT.

Witnesses:
  JNO. G. MUNDY,
  THOMAS A. WILSON.